(12) United States Patent
Fujita et al.

(10) Patent No.: US 12,682,747 B2
(45) Date of Patent: Jul. 14, 2026

(54) EVENT RECORDING SYSTEM, EVENT RECORDING DEVICE, AND EVENT RECORDING METHOD

(71) Applicant: DENSO CORPORATION, Kariya-city (JP)

(72) Inventors: Taishi Fujita, Kariya-city (JP); Isao Okawa, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 127 days.

(21) Appl. No.: 18/423,088

(22) Filed: Jan. 25, 2024

(65) Prior Publication Data

US 2024/0161607 A1 May 16, 2024

Related U.S. Application Data

(63) Continuation of application No. PCT/JP2022/025360, filed on Jun. 24, 2022.

(30) Foreign Application Priority Data

Jul. 28, 2021 (JP) ................................. 2021-123368

(51) Int. Cl.
G06V 20/00 (2022.01)
G06T 7/00 (2017.01)
(Continued)

(52) U.S. Cl.
CPC ............. G08G 1/0137 (2013.01); G06T 7/20 (2013.01); G06V 20/58 (2022.01); G08G 1/0112 (2013.01);
(Continued)

(58) Field of Classification Search
CPC ...... G08G 1/0137; G08G 1/0112; G08G 1/04; G06V 20/58; G06V 2201/08; H04N 23/60;
(Continued)

(56) References Cited

U.S. PATENT DOCUMENTS

2009/0315978 A1* 12/2009 Wurmlin ................... G06T 7/85
348/E13.001
2012/0229659 A1* 9/2012 Solomon ................ H04N 25/61
348/207.11
(Continued)

FOREIGN PATENT DOCUMENTS

JP 2010-108069 A 5/2010
JP 2018-101299 A 6/2018

*Primary Examiner* — Tiffany P Young
(74) *Attorney, Agent, or Firm* — Precision Patents, P.C.

(57) ABSTRACT

A contact event occurring in a vicinity of a host vehicle equipped with an external sensor for detecting detection information of an external environment is recorded. It is determined whether the contact event occurs at a plurality of target objects including at least one type of a road user and a road installation object other than the host vehicle, based on a type, a moving speed, and overlap of the target objects. A pair of the target objects determined that the contact event occurs is tracked, and the detection information is recorded. A control parameter of the external sensor is adjusted according to the tracking of the pair while the host vehicle continues travelling.

21 Claims, 12 Drawing Sheets

(51) Int. Cl.
   *G06T 7/20*      (2017.01)
   *G06V 20/58*     (2022.01)
   *G08G 1/00*      (2006.01)
   *G08G 1/01*      (2006.01)
   *G08G 1/04*      (2006.01)
   *H04N 23/60*     (2023.01)

(52) U.S. Cl.
   CPC .............. *G08G 1/04* (2013.01); *H04N 23/60*
       (2023.01); *G06T 2207/10028* (2013.01); *G06T*
               *2207/30252* (2013.01); *G06V 2201/08*
                                              (2022.01)

(58) Field of Classification Search
   CPC ............. G06T 7/20; G06T 2207/10028; G06T
                                           2207/30252
   USPC ....................................................... 701/29.2
   See application file for complete search history.

(56)                    References Cited

U.S. PATENT DOCUMENTS

| | | | |
|---|---|---|---|
| 2018/0188514 A1* | 7/2018 | Arianpour .............. | G02B 27/16 |
| 2020/0394427 A1 | 12/2020 | Takahashi et al. | |
| 2021/0409379 A1* | 12/2021 | Hwang ................ | G08G 1/0112 |
| 2022/0092862 A1* | 3/2022 | Faulkner ................ | G06V 40/18 |

* cited by examiner

FIG. 5

|  | TAR OBJ α | | | | | |
| TAR OBJ β | 4 WHEEL VEH (HI SPEED RANGE) | 2 WHEEL VEH (HI SPEED RANGE) | 4 WHEEL VEH (LO SPEED RANGE) | 2 WHEEL VEH (LO SPEED RANGE) | ROAD INST OBJ | HUMAN |
|---|---|---|---|---|---|---|
| 4 WHEEL VEH (HI SPEED RANGE) | CONTACT | CONTACT | CONTACT | CONTACT | CONTACT | CONTACT |
| 2 WHEEL VEH (HI SPEED RANGE) | CONTACT | CONTACT | CONTACT | CONTACT | CONTACT | CONTACT |
| 4 WHEEL VEH (LO SPEED RANGE) | CONTACT | CONTACT | CONTACT | CONTACT | CONTACT | EXCLUSION |
| 2 WHEEL VEH (LO SPEED RANGE) | CONTACT | CONTACT | CONTACT | CONTACT | EXCLUSION | EXCLUSION |
| ROAD INST OBJ | CONTACT | CONTACT | CONTACT | EXCLUSION | EXCLUSION | EXCLUSION |
| HUMAN | CONTACT | CONTACT | EXCLUSION | EXCLUSION | EXCLUSION | EXCLUSION |

FIG. 13

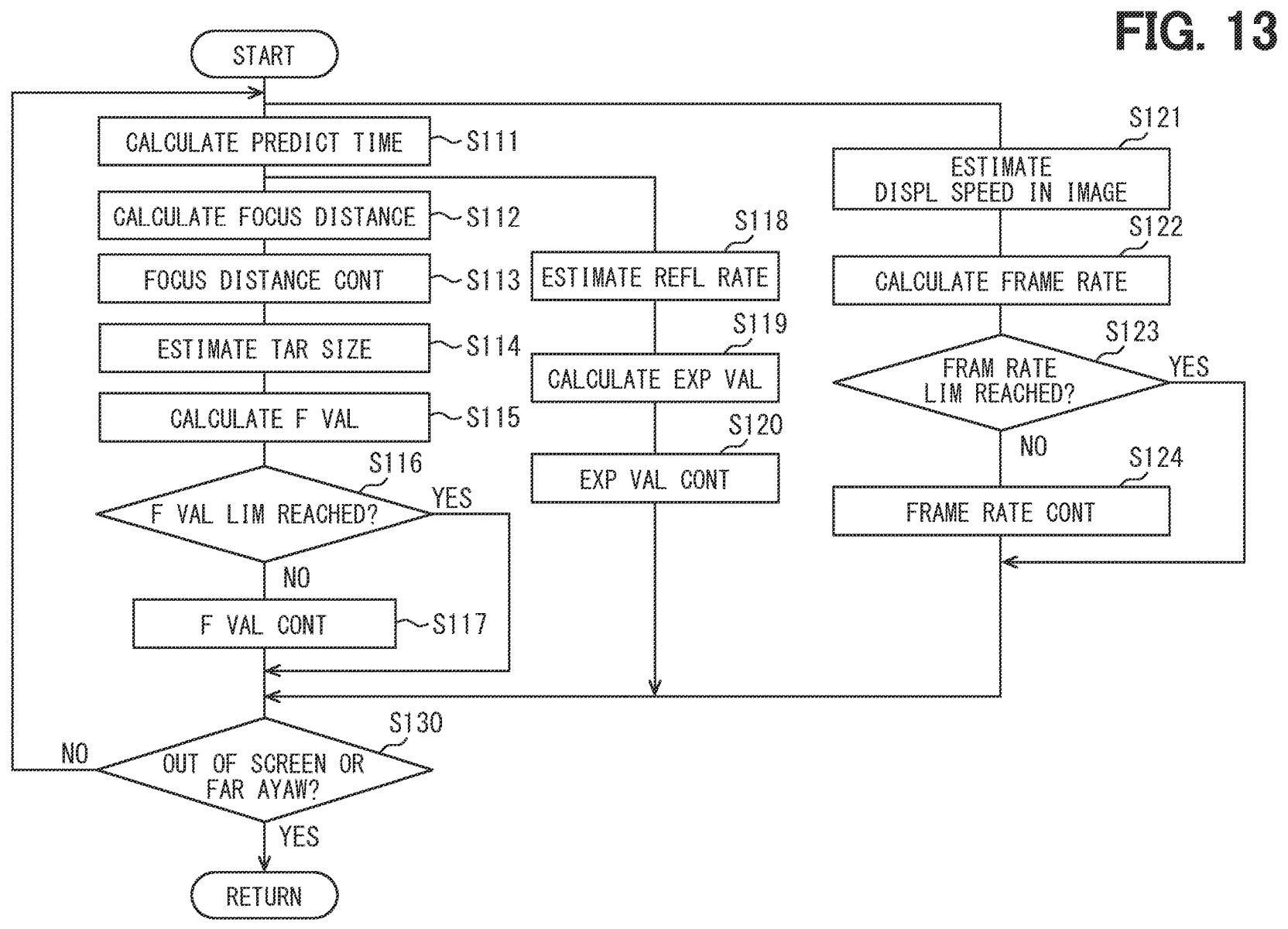

START

CALCULATE PREDICT TIME — S111

CALCULATE FOCUS DISTANCE — S112

FOCUS DISTANCE CONT — S113

ESTIMATE TAR SIZE — S114

CALCULATE F VAL — S115

F VAL LIM REACHED? — S116
YES / NO

F VAL CONT — S117

ESTIMATE REFL RATE — S118

CALCULATE EXP VAL — S119

EXP VAL CONT — S120

ESTIMATE DISPL SPEED IN IMAGE — S121

CALCULATE FRAME RATE — S122

FRAM RATE LIM REACHED? — S123
YES / NO

FRAME RATE CONT — S124

OUT OF SCREEN OR FAR AYAW? — S130
YES / NO

YES → RETURN

FIG. 14

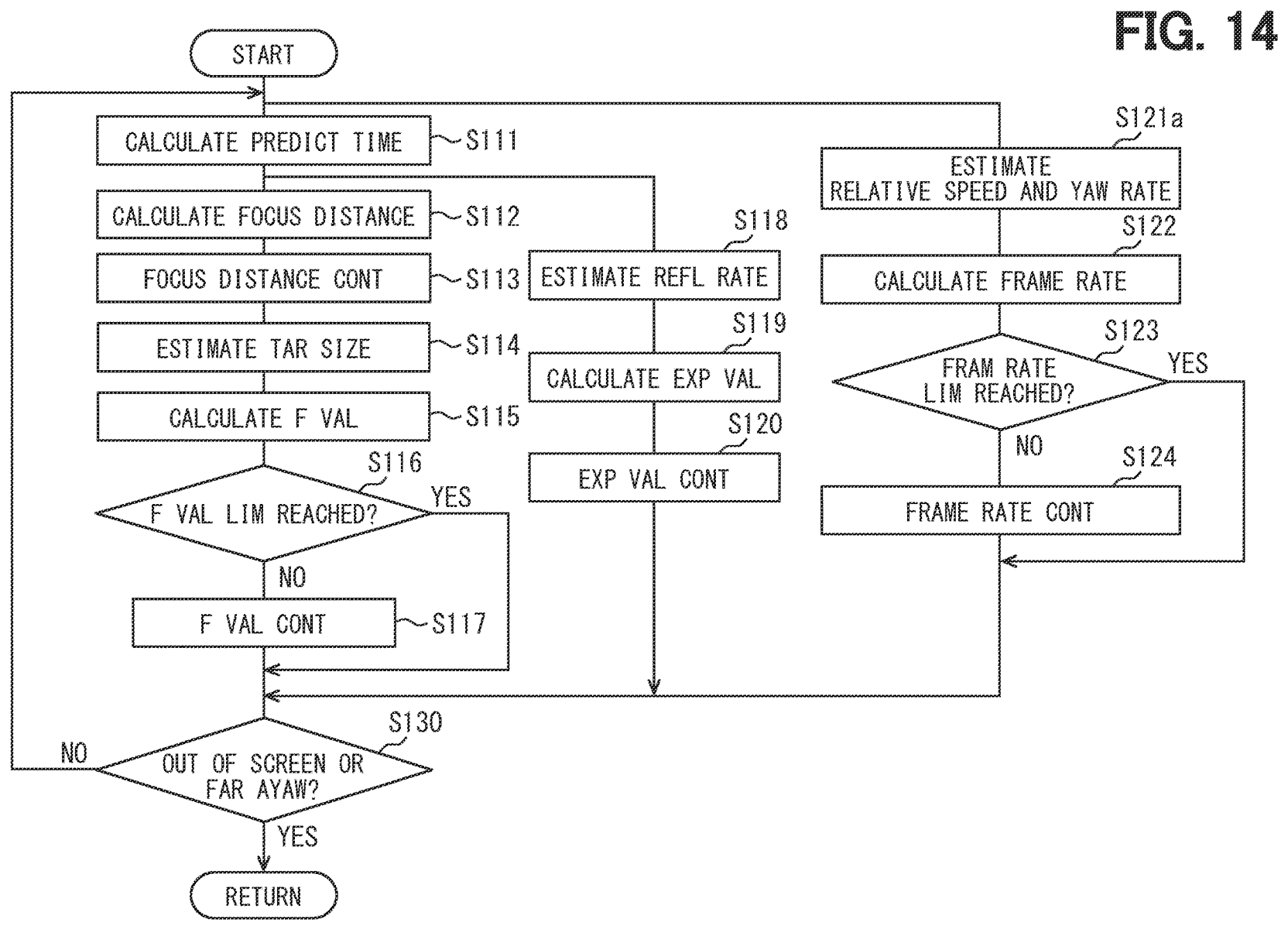

START

CALCULATE PREDICT TIME — S111

CALCULATE FOCUS DISTANCE — S112

FOCUS DISTANCE CONT — S113

ESTIMATE TAR SIZE — S114

CALCULATE F VAL — S115

ESTIMATE REFL RATE — S118

CALCULATE EXP VAL — S119

EXP VAL CONT — S120

ESTIMATE RELATIVE SPEED AND YAW RATE — S121a

CALCULATE FRAME RATE — S122

FRAM RATE LIM REACHED? — S123
YES
NO

FRAME RATE CONT — S124

F VAL LIM REACHED? — S116
YES
NO

F VAL CONT — S117

OUT OF SCREEN OR FAR AYAW? — S130
YES
NO

RETURN

EVENT RECORDING SYSTEM, EVENT RECORDING DEVICE, AND EVENT RECORDING METHOD

CROSS REFERENCE TO RELATED APPLICATION

The present application is a continuation application of International Patent Application No. PCT/JP2022/025360 filed on Jun. 24, 2022, which designated the U.S. and claims the benefit of priority from Japanese Patent Application No. 2021-123368 filed on Jul. 28, 2021. The entire disclosures of all of the above applications are incorporated herein by reference.

TECHNICAL FIELD

The present disclosure relates to a contact determination technique for determining whether or not a contact event with a predicted risk occurs between target objects in the vicinity of a host vehicle.

BACKGROUND

A conceivable technique teaches a technique for detecting position information, moving direction information, traffic guidance information, and the like of other vehicles and recording each information when an event related to other vehicles has occurred. Further, another conceivable technique teaches a technique for detecting the occurrence of a contact event with a predicted risk for a commercial vehicle. This technique detects the occurrence of a vehicle contact event when the rate of decrease in the number of vehicle speed pulses output from a vehicle speed sensor of a commercial vehicle (that is, negative acceleration) or the angular velocity is equal to or greater than a determination criterion value.

SUMMARY

According to an example, a contact event occurring in a vicinity of a host vehicle equipped with an external sensor for detecting detection information of an external environment is recorded. It is determined whether the contact event occurs at a plurality of target objects including at least one type of a road user and a road installation object other than the host vehicle, based on a type, a moving speed, and overlap of the target objects. A pair of the target objects determined that the contact event occurs is tracked, and the detection information is recorded. A control parameter of the external sensor is adjusted according to the tracking of the pair while the host vehicle continues travelling.

BRIEF DESCRIPTION OF THE DRAWINGS

The above and other objects, features and advantages of the present disclosure will become more apparent from the following detailed description made with reference to the accompanying drawings. In the drawings:

FIG. 5 is a diagram showing a lookup table for contact determination according to the first embodiment;

FIG. 13 is a flowchart showing detailed processing in FIG. 11;

FIG. 14 is a flow chart showing an event recording method according to the third embodiment.

DETAILED DESCRIPTION

Figure 1:
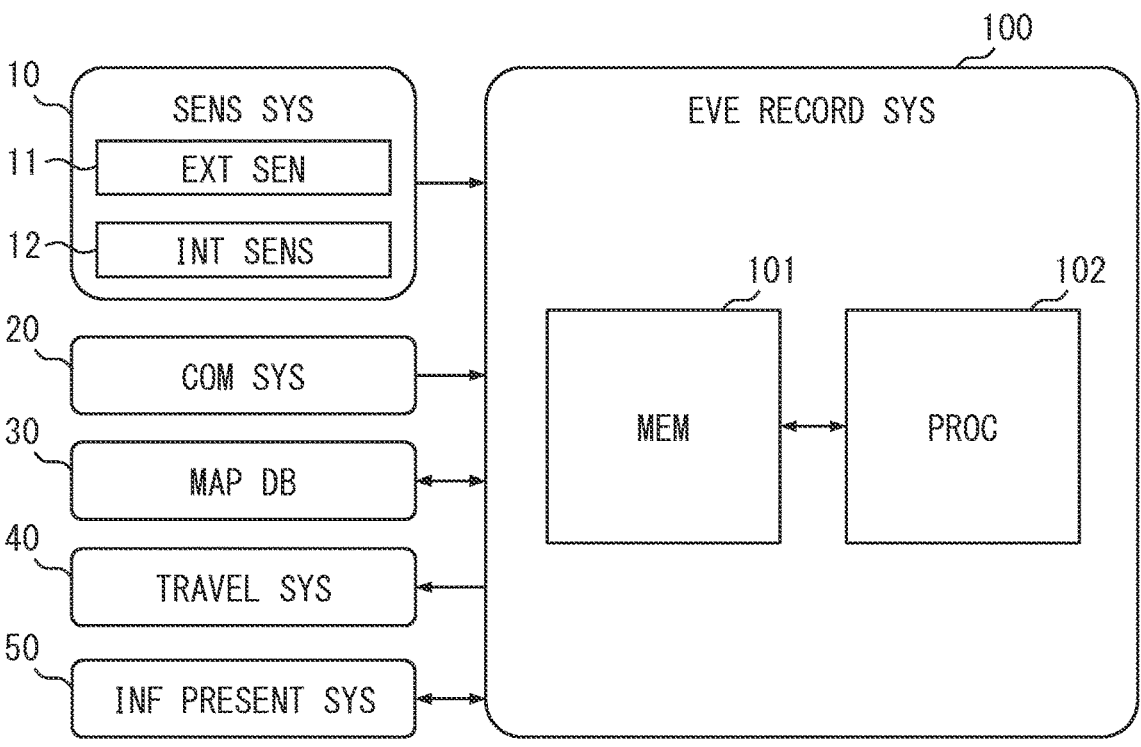
FIG. 1 is a block diagram illustrating an overall configuration according to a first embodiment.

In recent years, there has been an increasing need to reliably record a contact event when the contact event has occurred between various target objects in the vicinity of the host vehicle. The conceivable technique has a room for improvement regarding the certainty of recording contact events. In addition, if it is attempted to determine whether or not a contact event occurs simply based on the acceleration or angular velocity of the target object, as in the technique of the other conceivable technique, the characteristics of the behavior of each target object differ, so that the determination may be difficult to be suitable for the target object as the determination target. As a result, there is a possibility that the occurrence of a contact event cannot be reliably determined and the contact event cannot be reliably recorded.

According to the present embodiments, an event recording system is capable of reliably recording a contact event. According to the present embodiments, an event recording device is capable of reliably recording a contact event. According to the present embodiments, an event recording method is capable of reliably recording a contact event. According to the present embodiments, an event recording program is capable of reliably recording a contact event.

According to the present embodiments, an event recording system has a processor and records a contact event occurring in a vicinity of a host vehicle that is equipped with an external sensor for detecting detection information about an external environment.

The processor is configured to execute:

determining whether the contact event occurs at a plurality of target objects including at least one type of a road user and a road installation object other than the host vehicle, based on a type of the target objects, a moving speed of the target objects that are movable, and a presence or absence of overlap between target models that are prepared by modeling the target objects; and tracking a pair of target objects at which the contact event occurs, and recording the detection information.

The recording of the detection information includes adjusting a control parameter of the external sensor of the host vehicle while continuing to travel, in response to the tracking of the pair of target objects.

According to the present embodiments, an event recording device has a processor and records a contact event occurring in a vicinity of a host vehicle that is equipped with an external sensor for detecting detection information about an external environment.

The processor is configured to execute:

determining whether the contact event occurs at a plurality of target objects including at least one type of a road user and a road installation object other than the host vehicle, based on a type of the target objects, a moving speed of the target objects that are movable, and a presence or absence of overlap between target models that are prepared by modeling the target objects; and tracking a pair of target objects at which the contact event occurs, and recording the detection information.

The recording of the detection information includes adjusting a control parameter of the external sensor of the host vehicle while continuing to travel, in response to the tracking of the pair of target objects.

According to the present embodiments, an event recording method is executed by a processor for recording a contact event occurring in a vicinity of a host vehicle equipped with an external sensor for detecting detection information about an external environment.

The event recording method includes:

determining whether the contact event occurs at a plurality of target objects including at least one type of a road user and a road installation object other than the host vehicle, based on a type of the target objects, a moving speed of the target objects that are movable, and a presence or absence of overlap between target models that are prepared by modeling the target objects; and tracking a pair of target objects at which the contact event occurs, and recording the detection information.

The recording of the detection information includes adjusting a control parameter of the external sensor of the host vehicle while continuing to travel, in response to the tracking of the pair of target objects.

According to the present embodiments, an event recording program is stored in a storage medium and includes instructions to be executed by a processor for recording a contact event occurring in a vicinity of a host vehicle equipped with an external sensor for detecting detection information about an external environment.

The instructions include:

determining whether the contact event occurs at a plurality of target objects including at least one type of a road user and a road installation object other than the host vehicle, based on a type of the target objects, a moving speed of the target objects that are movable, and a presence or absence of overlap between target models that are prepared by modeling the target objects; and tracking a pair of target objects at which the contact event occurs, and recording the detection information.

The recording of the detection information includes adjusting a control parameter of the external sensor of the host vehicle while continuing to travel, in response to the tracking of the pair of target objects.

According to these first to fourth aspects, the presence or absence of overlap is determined for at least two of the target models that are prepared by modeling the target objects, and the presence or absence of the contact event for which a risk is predicted is determined for a pair of target objects at which the presence of the overlap is determined, based on the type and the moving speed thereof. Therefore, it is possible to determine whether or not the contact event occurs, taking into consideration the behavior characteristics of each target object due to its type and moving speed. Then, the control parameter of the external sensor to be recorded can be adjusted according to the tracking of the pair of target objects at which the contact event has occurred. Therefore, the contact event can be reliably recorded.

According to the present embodiments, an event recording system has a processor and records a contact event occurring in a vicinity of a host vehicle that is equipped with an external sensor for detecting detection information about an external environment.

The processor is configured to execute:

determining whether the contact event occurs at a plurality of target objects including at least one type of a road user and a road installation object other than the host vehicle, based on a type of the target objects, a moving speed of the target objects that are movable, and a presence or absence of overlap between target models that are prepared by modeling the target objects; and tracking a pair of target objects at which the contact event occurs, and recording the detection information relating to the pair of target objects; and controlling a travelling behavior of the host vehicle in response to the recording of the detection information relating to the pair of the target objects.

According to the present embodiments, an event recording device has a processor and records a contact event occurring in a vicinity of a host vehicle that is equipped with an external sensor for detecting detection information about an external environment.

The processor is configured to execute:

determining whether the contact event occurs at a plurality of target objects including at least one type of a road user and a road installation object other than the host vehicle, based on a type of the target objects, a moving speed of the target objects that are movable, and a presence or absence of overlap between target models that are prepared by modeling the target objects; and tracking a pair of target objects at which the contact event occurs, and recording the detection information relating to the pair of target objects; and controlling a travelling behavior of the host vehicle in response to the recording of the detection information relating to the pair of the target objects.

According to the present embodiments, an event recording method is executed by a processor for recording a contact event occurring in a vicinity of a host vehicle equipped with an external sensor for detecting detection information about an external environment.

The event recording method includes:

determining whether the contact event occurs at a plurality of target objects including at least one type of a road user and a road installation object other than the host vehicle, based on a type of the target objects, a moving speed of the target objects that are movable, and a presence or absence of overlap between target models that are prepared by modeling the target objects; and tracking a pair of target objects at which the contact event occurs, and recording the detection information relating to the pair of target objects; and controlling a travelling behavior of the host vehicle in response to the recording of the detection information relating to the pair of the target objects.

According to the present embodiments, an event recording program is stored in a storage medium and includes instructions to be executed by a processor for recording a contact event occurring in a vicinity of a host vehicle equipped with an external sensor for detecting detection information about an external environment.

The instructions include:

determining whether the contact event occurs at a plurality of target objects including at least one type of a road user and a road installation object other than the host vehicle, based on a type of the target objects, a moving speed of the target objects that are movable, and a presence or absence of overlap between target models that are prepared by modeling the target objects; and tracking a pair of target objects at which the contact event occurs, and recording the detection information relating to the pair of target objects; and controlling a travelling behavior of the host vehicle in response to the recording of the detection information relating to the pair of the target objects.

According to these fifth to eighth aspects, the presence or absence of overlap is determined for at least two of the target models that are prepared by modeling the target objects, and the presence or absence of the contact event for which a risk is predicted is determined for a pair of target objects at which the presence of the overlap is determined, based on the type and the moving speed thereof. Therefore, it is possible to determine whether or not the contact event occurs, taking into consideration the behavior characteristics of each target object due to its type and moving speed. Then, the travelling behavior of the host vehicle is controlled according to the record relating to the pair of target objects at which the contact event has occurred. Therefore, it is possible to realize the travelling of the host vehicle that is suitable for recording, so that it is possible to reliably record the contact event.

According to the present embodiments, a non-transitory tangible computer readable storage medium includes instructions being executed by a processor for recording a contact event occurring in a vicinity of a host vehicle equipped with an external sensor for detecting detection information of an external environment.

The instructions include:

determining whether the contact event occurs at a plurality of target objects including at least one type of a road user and a road installation object other than the host vehicle, based on a type of the target objects, a moving speed of the target objects that are movable, and a presence or absence of overlap between target models that are prepared by modeling the target objects; and tracking a pair of the target objects determined that the contact event occurs, and recording the detection information relating to the pair of the target objects.

The recording of the detection information includes adjusting a control parameter of the external sensor according to the detection information relating to the pair of the target objects in the tracking of the pair while the host vehicle continues travelling.

According to the present embodiments, a non-transitory tangible computer readable storage medium includes instructions being executed by a processor for recording a contact event occurring in a vicinity of a host vehicle equipped with an external sensor for detecting detection information of an external environment.

The instructions include:

determining whether the contact event occurs at a plurality of target objects including at least one type of a road user and a road installation object other than the host vehicle, based on a type of the target objects, a moving speed of the target objects that are movable, and a presence or absence of overlap between target models that are prepared by modeling the target objects;

tracking a pair of the target objects determined that the contact event occurs, and recording the detection information relating to the pair of the target objects; and controlling a travelling behavior of the host vehicle according to the recording of the detection information relating to the pair of the target objects.

Hereinafter, embodiments of the present disclosure will be described with reference to the drawings. It should be noted that the same reference numerals are assigned to corresponding components in the respective embodiments, and overlapping descriptions may be omitted. When only a part of the configuration is described in the respective embodiments, the configuration of the other embodiments described before may be applied to other parts of the configuration. Further, not only the combinations of the configurations explicitly shown in the description of the respective embodiments, but also the configurations of the plurality of embodiments can be partially combined together even if the configurations are not explicitly shown if there is no difficulty in the combination in particular.

Hereinafter, an embodiment of the present disclosure will be described with reference to the drawings.

First Embodiment

Figure 2:
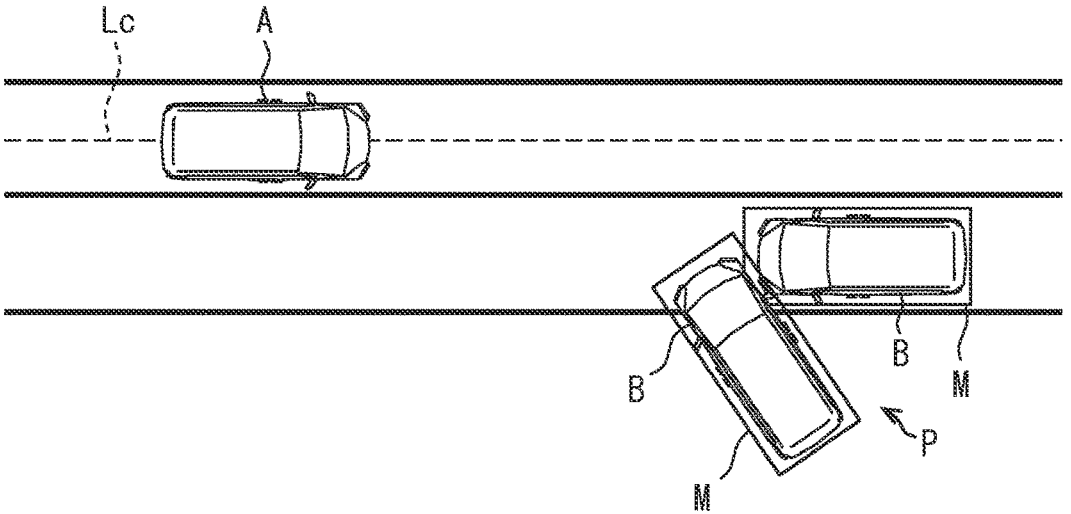
FIG. 2 is a schematic diagram showing a traveling environment of a host vehicle to which the first embodiment is applied.

The event recording system 100 of the first embodiment shown in FIG. 1 records a contact event occurring around the host vehicle A shown in FIG. 2. From a viewpoint focusing on the host vehicle A, the host vehicle A may be also defined as a subject vehicle (i.e., an ego-vehicle). From a viewpoint focusing on the host vehicle A, the target object B may be also defined as another road user. The target object B includes, for example, a vehicle (including a four-wheel vehicle and a two-wheel vehicle), a road installation object, and a human. The road installation object includes, for example, at least one or more types of a guardrail, a road sign, a traffic light, a footbridge, a fence, a building, and a facility such as a private house. Also, the human here is a person who does not use a vehicle for movement on the road, such as a pedestrian or a runner.

The host vehicle A is provided with an autonomous driving mode classified according to the degree of manual intervention of the driver in the driving task. The automated driving mode may be achieved with an autonomous driving control, such as conditional driving automation, advanced driving automation, or full driving automation, where the system in operation performs all driving tasks. The automatic driving mode may be achieved with an advanced driving assistance control, such as driving assistance or partial driving automation, where the occupant performs some or all driving tasks. The autonomous driving mode may be realized by either one or combination of automatic driving control and advanced driving assistance control or switching between the automatic control and advanced driving assistance control.

Figure 3:
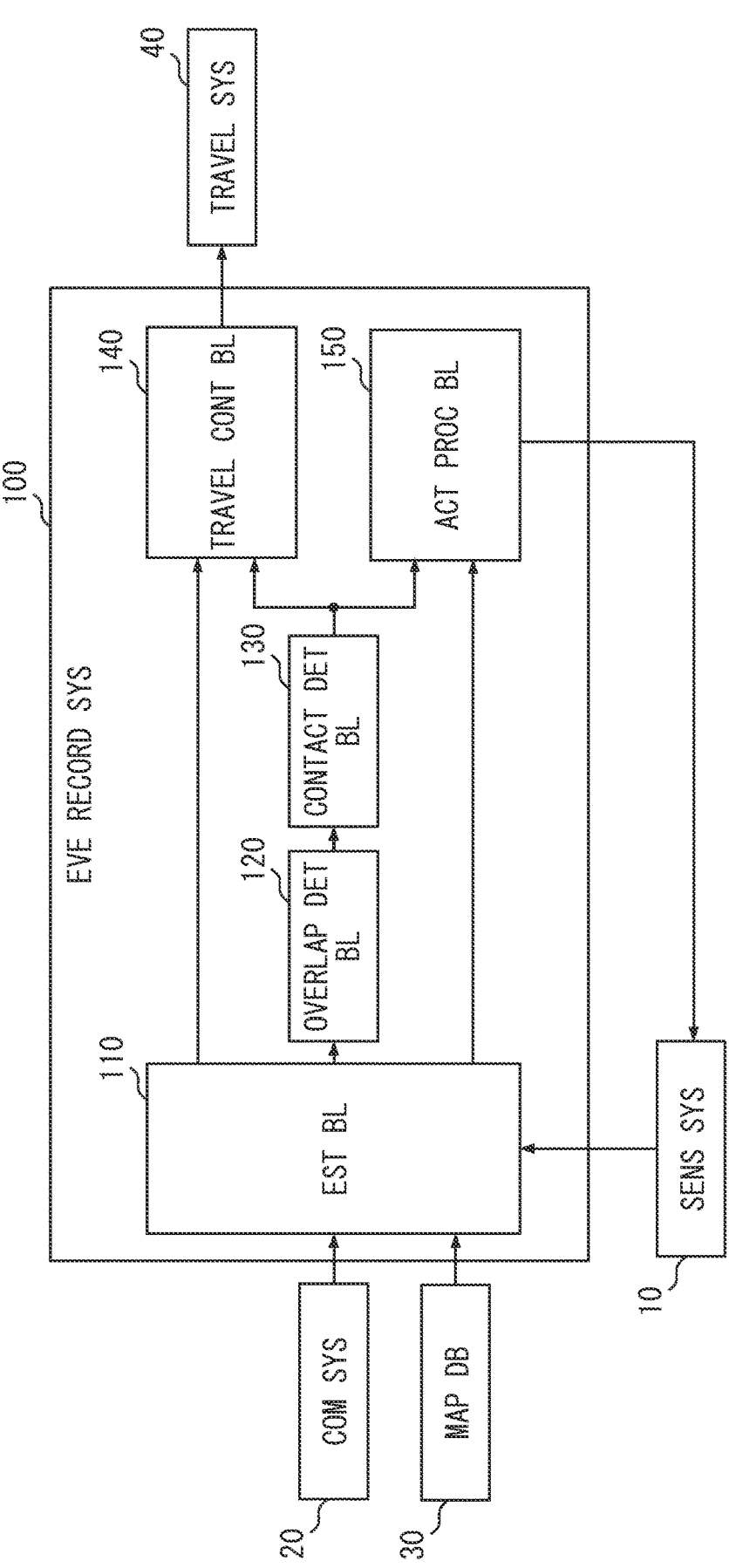
FIG. 3 is a block diagram showing the functional configuration of the event recording system according to the first embodiment.

The host vehicle A is equipped with a sensor system 10, a communication system 20, a map database (hereinafter referred to as "DB") 30, a travel system 40, and an information presentation system 50 shown in FIG. 3. The sensor system 10 acquires sensor information that can be used by the event recording system 100 by detecting the external environment and an internal environment of the host vehicle A. For this purpose, the sensor system 10 includes an external sensor 11 and an internal sensor 12.

The external sensor 11 acquires external environment information (i.e., detection information) that can be used by the event recording system 100 from the external environment, which is the surrounding environment of the host vehicle A. The external sensor 11 may acquire the external environment information by detecting an object disposed in the outside of the host vehicle A. The external sensor 11 of the object detection type is at least one of an external camera, a LIDAR (i.e., Light Detection and Ranging/Laser Imaging Detection and Ranging), a radar, sonar, and the like, for example.

The internal sensor 12 acquires internal environment information that can be used by the event recording system 100 from the internal environment, which is the internal environment of the host vehicle A. The internal sensor 12 may acquire the internal information by detecting a specific motion physical quantity in the inside of the host vehicle A. The physical quantity detection type internal sensor 12 is at least one type of, for example, a travelling speed sensor, an acceleration sensor, a gyro sensor, and the like. The internal sensor 12 may acquire the internal environment information by detecting a specific state of a passenger in the internal environment of the host vehicle A. The passenger detection type internal sensor 12 is at least one of, for example, a driver status monitor (registered trademark), a biosensor, a seating sensor, an actuator sensor, an in-vehicle equipment sensor, and the like.

The communication system 20 acquires communication information that can be used by the event recording system 100 by wireless communication. The communication system 20 may receive a positioning signal from an artificial satellite of a global navigation satellite system (i.e., GNSS) existing in the outside of the host vehicle A. The positioning type communication system 20 is, for example, a GNSS receiver or the like. The communication system 20 may transmit and receive communication signals with a V2X system existing in the outside of the host vehicle A. The V2X type communication system 20 is at least one type of, for example, a dedicated short range communications (i.e., DSRC) communication device, a cellular V2X (i.e., C-V2X) communication device, and the like. The communication system 20 may transmit and receive communication signals to and from a terminal existing in the inside of the host vehicle A. The terminal communication type communication system 20 is, for example, at least one of Bluetooth (registered trademark) equipment, Wi-Fi (registered trademark) equipment, infrared communication equipment, and the like.

The map DB 30 stores map information that can be used by the event recording system 100. The map DB 30 includes at least one type of non-transitory tangible storage medium of, for example, a semiconductor memory, a magnetic medium, an optical medium, and the like. The map DB 30 may be a database of a locator for estimating the state quantity of the host vehicle A' including the position of the host vehicle A. The map DB 30 may be a database of a navigation unit that navigates the travel route of the host vehicle A. The map DB 30 may be a combination of such databases.

For example, the map DB 30 acquires and stores the latest map information through communication with an external center via the communication system 20 of the V2X type. The map information is a two or three-dimensional data indicating a traveling environment of the host vehicle A as the information. Digital data of a high definition map may be adopted as the three-dimensional map data. The map information may include road information representing at least one of the position, shape, road surface condition, and the like of the road itself. The map information may include traffic sign information representing at least one of the position and shape of traffic signs and lane markings attached to roads, for example. The map information may include, for example, structure information representing at least one of the positions and shapes of buildings and traffic lights facing roads.

The travel system 40 is configured to run the body of the host vehicle A based on commands from the event recording system 100. The travel system 40 includes a drive unit that drives the host vehicle A, a braking unit that brakes the host vehicle A, and a steering unit that steers the host vehicle A.

The information presentation system 50 presents notification information to the occupants of the host vehicle A. The information presentation system 50 may present notification information by stimulating the occupant's vision. The visual stimulus type information presentation system 50 is at least one type of, for example, a head-up display (i.e., HUD), a multi function display (i.e., MFD), a combination meter, a navigation unit, a light emitting unit, and the like. The information presentation system 50 may present notification information by stimulating the occupant's auditory. The auditory stimulation type information presentation system 50 is, for example, at least one of a speaker, a buzzer, a vibration unit, and the like. The information presentation system 50 may present notification information by stimulating the occupant's skin sensation. The skin sensation stimulated by the skin sensation stimulation type information presentation system 50 includes, for example, at least one of haptic stimulus, temperature stimulus, wind stimulus, and the like. The skin sensation stimulus type information presentation system 50 is, for example, at least one of a steering wheel vibration unit, a driver's seat vibration unit, a steering wheel reaction force unit, an accelerator pedal reaction force unit, a brake pedal reaction force unit, and an air conditioning unit.

The event recording system 100 is connected to the sensor system 10, the communication system 20, the map DB 30, and the information presentation system 50 via at least one of a LAN (i.e., Local Area Network), a wire harness, an internal bus, a wireless communication line, and the like. The event recording system 100 includes at least one dedicated computer.

The dedicated computer that configures the event recording system 100 may be a drive control ECU (i.e., Electronic Control Unit) that controls the driving operation of the host vehicle A. The dedicated computer that constitutes the event recording system 100 may be a navigation ECU that navigates a travel route of the host vehicle A. The dedicated computer that configures the event recording system 100 may be a locator ECU that estimates the self-state quantity of the host vehicle A. The dedicated computer that configures the event recording system 100 may be an actuator ECU that controls the travel actuators of the host vehicle A. The dedicated computer that constitutes the event recording system 100 may be an HCU (i.e., Human Machine Interface Control Unit or HMI Control Unit) that controls information presentation by the information presentation system 50 in the host vehicle A. The dedicated computer that configures the event recording system 100 may be a computer other than the host vehicle A that configures an external center or a mobile terminal that can communicate via the V2X type communication system 20, for example.

The dedicated computer that configures the event recording system 100 may be an integrated ECU (i.e., Electronic Control Unit) that integrally controls the driving operation of the host vehicle A. The dedicated computer that configures the event recording system 100 may be a determination ECU that determines driving tasks in the driving control of the host vehicle A. The dedicated computer that constitutes the event recording system 100 may be a monitoring ECU that monitors the driving control of the host vehicle A. The dedicated computer that constitutes the event recording system 100 may be an evaluation ECU that evaluates the driving control of the host vehicle A.

The dedicated computer that constitutes the event recording system 100 has at least one memory 101 and at least one processor 102. The memory 101 is at least one type of non-transitory tangible storage medium, such as a semiconductor memory, a magnetic medium, and an optical medium, for storing, in non-transitory manner, computer readable programs and data. The processor 102 includes at least one type of, for example, a CPU (i.e., Central Processing Unit), a GPU (i.e., Graphics Processing Unit), a RISC (i.e., Reduced Instruction Set Computer)-CPU, a DFP (i.e., Data Flow Processor), a GSP (i.e., Graph Streaming Processor), or the like as a core.

In the event recording system 100, the processor 102 executes multiple commands included in the event recording program stored in the memory 101 for determining whether or not a contact event with a predicted risk occurs between the target objects B in the vicinity of the host vehicle A. As a result, the event recording system 100 constructs a plurality of functional blocks for determining whether or not a contact event between the target objects B occurs in the vicinity of the host vehicle A. A plurality of functional blocks constructed in the event recording system 100 include an estimation block 110, an overlap determination block 120, a contact determination block 130, a travel control block 140, and an action processing block 150 as shown in FIG. 3.

The estimation block 110 estimates target information for the target object B and host information for the host vehicle A. The target information includes, for example, the type, the position of the center of gravity, the direction of travel, the size, the relative velocity vector, and the ground speed of the target object B.

The estimation block 110 may estimate the type of the target object B by inputting information detected by the external sensor 11 such as an external camera image into a trained neural network.

In addition, the estimation block 110 may measure the center-of-gravity position, the traveling direction, and the size by modeling the target object B as a target model M. Specifically, the estimation block 110 clusters adjacent points in the measured point cloud data of the LiDAR, and models each cluster with a minimum circumscribing rectangle or a minimum circumscribing circle, so that the center of gravity position and the traveling direction, and the size are measured.

When modeled as a rectangle, the size of the target object B is defined by the length and the width of the rectangle. Also, when modeled as a circle, the size of the target object B is defined by the radius of the circle.

The estimation block 110 determines the modeled shape according to the type of the target object B. For example, the estimation block 110 may model the target object B as a rectangular model when the target object B is a vehicle, and model the target object B as a circular model when the target object B is a person. Here, the estimation block 110 may increase the size by adding a margin corresponding to the assumed measurement error.

The estimation block 110 may estimate the relative velocity vector by comparing with the center-of-gravity position at the time of the previous measurement. The estimation block 110 may estimate the ground speed by converting the relative velocity vector into a ground speed vector using the speed of the host vehicle A and the yaw rate.

The estimation block 110 continuously acquires the target information for at least the pair P of the target objects B determined to be in contact in the contact determination described later.

Also, the host information includes an offset amount and a relative accuracy with respect to the travelling lane of the host vehicle A. The estimation block 110 may estimate the offset amount and the relative angle of the subject vehicle based on the lane boundary line detected from the external camera image.

The overlap determination block 120 determines whether or not the target models overlap (i.e., overlap determination) for at least two target objects B based on the target information.

For the overlap determination, the overlap determination block 120 sets a pair P of target objects B as a determination target from the target objects B that have been detected. The overlap determination block 120 may set all possible pairs P as determination targets. Alternatively, the overlap determination block 120 may set any pair P as a determination target. For example, the overlap determination block 120 may set a pair P that can be set for target objects B existing within the peripheral range of the host vehicle A as a determination target. The peripheral range is a distance range surrounding the host vehicle A, and its size and shape may be set as appropriate.

The overlap determination block 120 predicts each position (i.e., future position) after a set time from the current position for the pair P of the target objects B as the determination target, and performs overlap determination of the target model M at that position. The overlap determination block 120 may predict future positions by, for example, linear prediction based on Expression 1 below. In the expression 1, $(x_p, y_p)$ is the future position of target object B, $(x, y)$ is the current position, T is the set time (for example, about 1 second), and $(v_x, v_y)$ is the relative velocity vector.

$$\begin{bmatrix} x_p \\ y_p \end{bmatrix} = \begin{bmatrix} x \\ y \end{bmatrix} + T \begin{bmatrix} v_x \\ v_y \end{bmatrix} \qquad \text{[Expression 1]}$$

Here, the overlap determination block 120 may set the set time to zero. In other words, the overlap determination block 120 may perform overlap determination for the pair P of target objects B at the current position rather than the future position.

The overlap determination block 120 calculates the coordinate position of the representative point for each target model at each future position. When the target model is rectangular, the overlap determination block 120 may use four vertices as representative points. When the target model is circular, the overlap determination block 120 may set the position of the center of gravity as the representative point.

The overlap determination block 120 performs overlap determination between target models for which representative points have been calculated. In the case of a pair P of rectangular target models M, the overlap determination block 120 determines that there is overlap for the pair P when at least one representative point is positioned inside the other.

Figure 4:
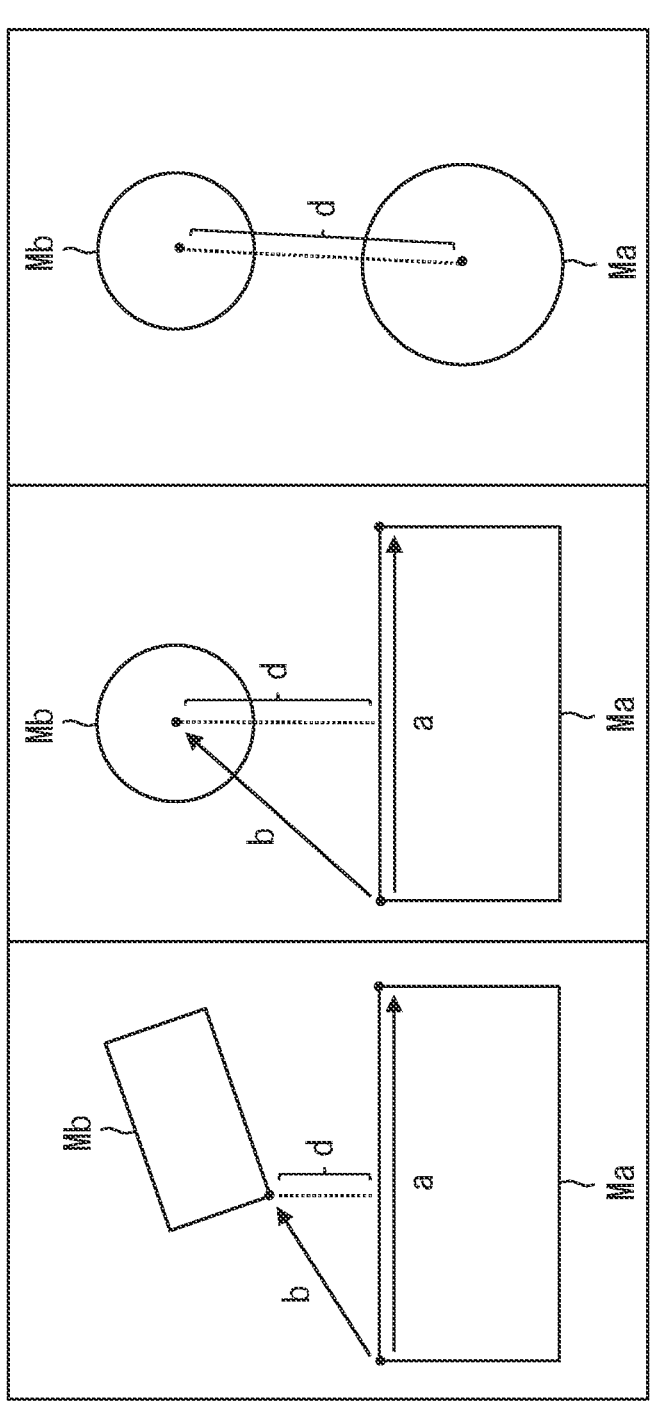
FIG. 4 is a schematic diagram for explaining overlap determination between target models according to the first embodiment.

A specific example of the overlap determination will be described in detail with reference to FIG. 4. In the following, one of the two target models M as the determination target is defined as model Ma, and the other is defined as model Mb. First, the overlap determination for a pair of rectangular target models M will be described. Here, as shown in the following expression 2, a vector directed from one representative point (i.e., specific representative point) to an adjacent representative point (i.e., adjacent representative point) in the model Ma is defined as a in bold, and the vector is defined by scalar values $a_x$ and $a_y$. Similarly, as shown in expression 2, a vector directed from a specific representative point to one representative point in the model Mb is denoted by b in bold, and the vector is defined by scalar values $b_x$ and $b_y$.

$$a = \begin{bmatrix} a_x \\ a_y \end{bmatrix}, b = \begin{bmatrix} b_x \\ b_y \end{bmatrix} \qquad \text{[Expression 2]}$$

In this case, the distance d from the specific representative point of the model Mb to the side (i.e., representative side) connecting the specific representative point and the adjacent representative point of the model Ma is represented by the following expression 3.

$$d = \frac{a_x b_y - a_y b_x}{\sqrt{a_x^2 + a_y^2}} \qquad \text{[Expression 3]}$$

The distance d takes a positive value when the specific representative point of the model Mb is positioned outside the representative side of the model Ma, and takes a negative value when positioned inside. Therefore, the overlap determination block 120 can determine that there is overlap when the distance d is a negative value.

Further, in the case of a pair P of a rectangular target model M and a circular target model M, the overlap determination can be performed by replacing the above model Mb with a circular one. In this case, the specific representative point of the model Mb is one point at the position of gravity center (i.e., center position) of the circle. The overlap determination block 120 may determine that there is overlap when the distance d is smaller than the radius of the model Mb.

In the case of a pair P of circular target models M, the overlap determination block 120 may determine that there is overlap when the distance between the representative points is less than the sum of the radii of the two target models.

The contact determination block 130 determines whether or not a contact event occurs (i.e., contact determination) for the pair P of the target objects B for which the target model M has been determined to overlap. In other words, the contact determination block 130 determines whether to classify the pair P of the target objects B as a pair P in which a contact event has occurred, or exclude it from the classification with the pair P in which a contact event has occurred. The contact determination block 130 performs contact determination based on the type information and the moving speed information.

In the contact determination, the contact determination block 130 classifies the target object B into one of a four-wheeled vehicle, a two-wheeled vehicle, a road installation, and a person based on the type information. The contact determination block 130 further classifies the four-wheeled vehicles and the two-wheeled vehicles into either a high speed range or a low speed range based on the moving speed information.

The contact determination block 130 determines whether or not the target objects B are in contact with each other based on the classification result of each target object B. For example, the contact determination block 130 performs determination based on the lookup table shown in FIG. 5.

Specifically, the contact determination block 130 determines whether a contact event occurs between vehicles, that is, between four-wheeled vehicles, between two-wheeled vehicles, and between a four-wheeled vehicle and a two-wheeled vehicle, regardless of the speed of each vehicle.

Further, the contact determination block 130 determines whether a contact event occurs with respect to the pair P of the vehicle in the high speed range and the road installation. In addition, the contact determination block 130 determines that a contact event occurs for the pair P of the vehicle in the high-speed range and the person.

Furthermore, the contact determination block 130 determines whether a contact event occurs for the pair P of the four-wheeled vehicle in the low speed range and the road installation. The contact determination block 130 also determines that no contact event occurs for the pair P of the two-wheeled vehicle in the low speed range and the road installation.

In addition, the contact determination block 130 determines that no contact event occurs for the pair P of the vehicle in the low-speed range and the person. Furthermore, the contact determination block 130 determines that no contact event occurs for the pair P of road installations, the pair P of a road installation and a person, and the pair P of people.

The travel control block 140 executes record travel control for controlling the travel behavior of the host vehicle A according to the record of the target object B.

Figure 6:
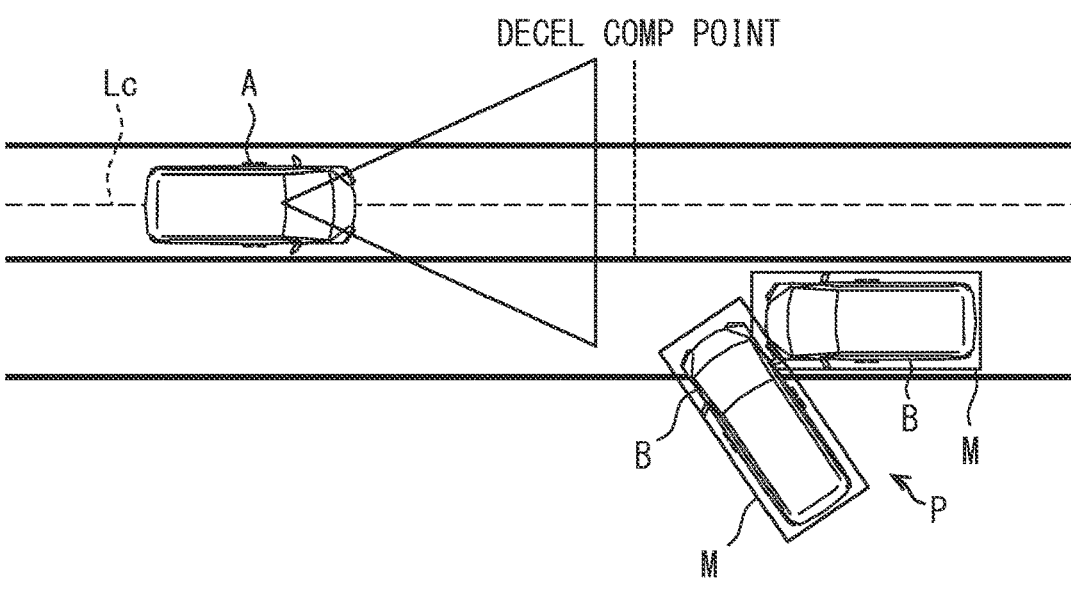
FIG. 6 is a schematic diagram for explaining a record travel control according to the first embodiment.

In the record travel control, the travel control block 140 mitigates temporal changes in the detected position of the host vehicle A that continues to travel, at least during the period in which the detection information about the specific range associated with the contact event of the pair P is recorded. The specific range is, for example, a range including the contact portion between the target objects B. For example, the travel control block 140 decelerates the travel speed to a predetermined speed range by the time the contact portion is included in the view angle of the external camera. That is, as shown in FIG. 6, the travel control block 140 completes deceleration of the host vehicle A by the deceleration completion point where the contact portion begins to be included in the view angle of the external camera. When a plurality of external cameras are mounted, the travel control block 140 may determine the deceleration completion point based on the external camera capable of imaging the contact portion within the view angle at first.

Figure 7:
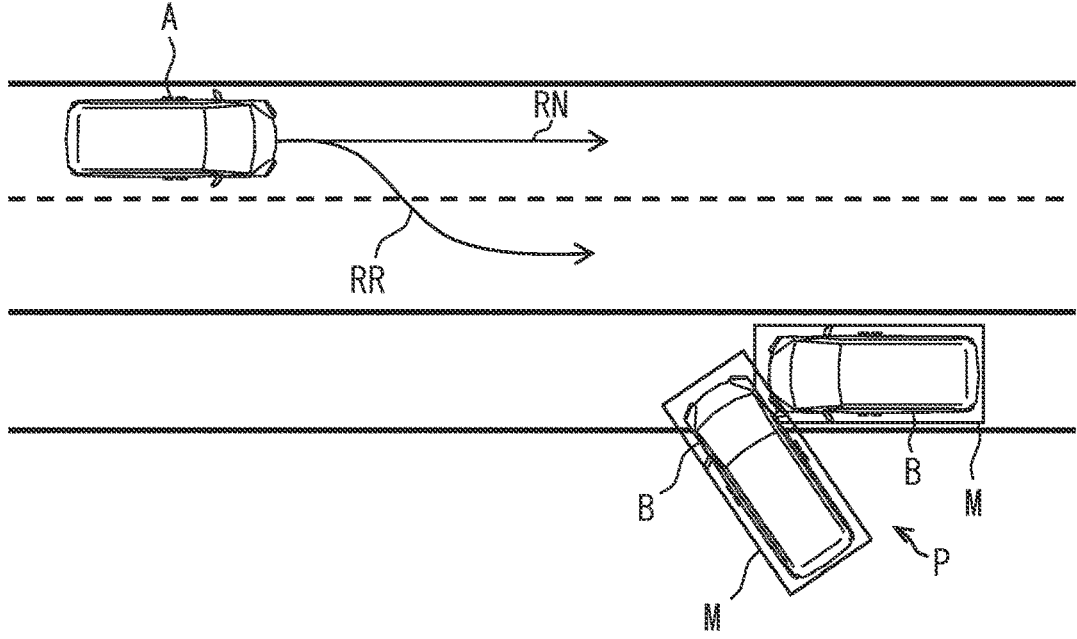
FIG. 7 is a schematic diagram for explaining a record travel control according to the first embodiment.
Figure 8:
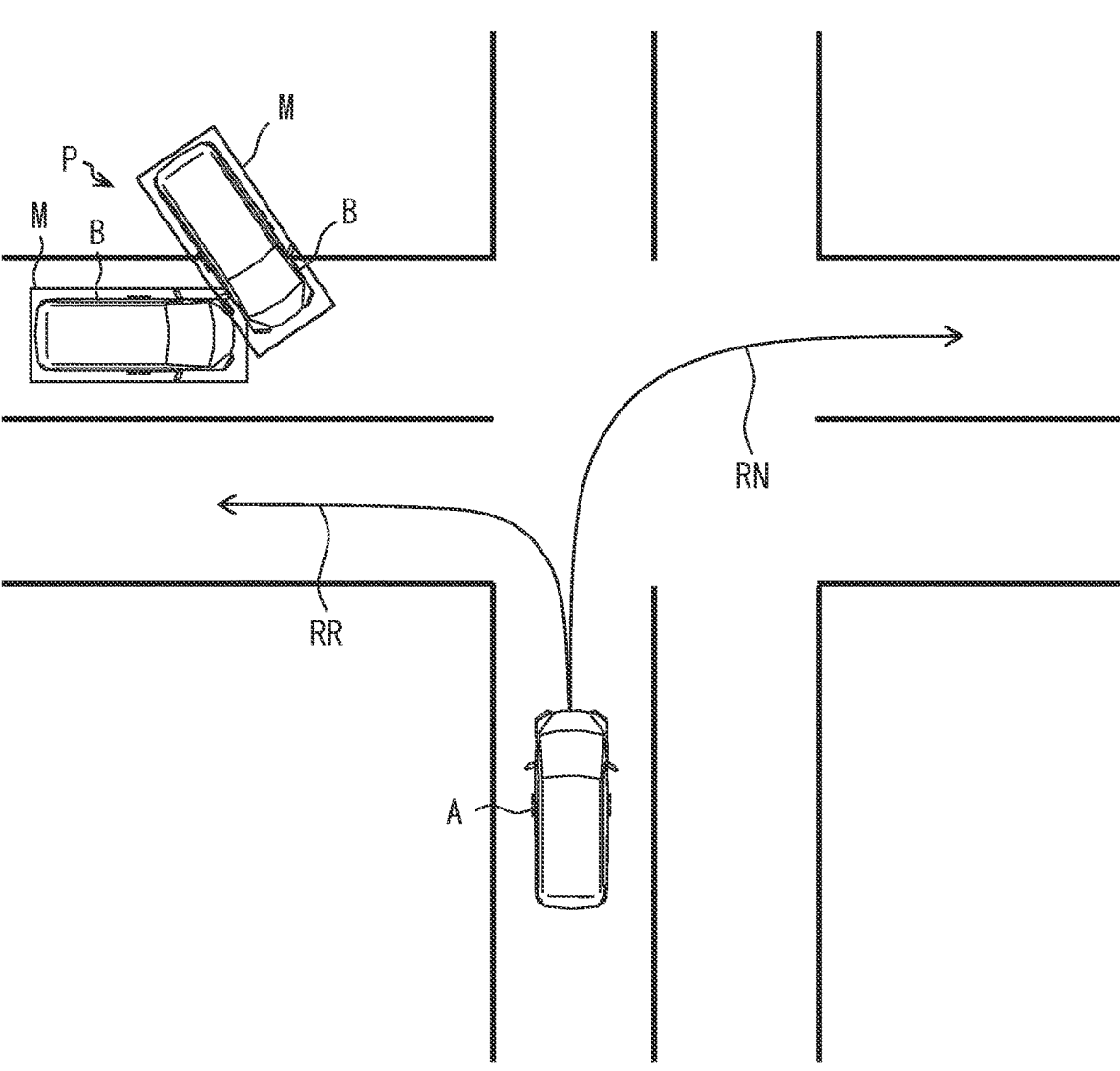
FIG. 8 is a schematic diagram for explaining a record travel control according to the first embodiment.

Also, in the record travel control, the travel control block 140 executes route control to change the travel route of the host vehicle A from the normal route RN, which is the travel route when recording is not performed, to the record travel route RR (see FIGS. 7 and 8). For example, the travel control block 140 sets the record travel route RR such that the target object B enters the view angle for a long time. Alternatively, the travel control block 140 may set a record travel route RR that ensures a desired focal length for the target object B. Alternatively, the record travel route RR may be set so that images can be captured from more angles from the contact portion.

The travel control block 140 may execute the above-described trajectory control when the permissible condition for permitting route control for recording is satisfied. The permission condition includes, for example, that the difference between the estimated arrival time at the destination when the record travel control is not performed and the estimated arrival time when the record travel control is performed is within the allowable time range. Alternatively, if the host vehicle A is a passenger vehicle such as a robot taxi, the allowable condition may be that there are no passengers in the vehicle. Alternatively, the allowable condition may be that at least one of the target objects B is of a specific type (e.g., ambulance, cash transport vehicle, and the like).

When it is determined that a contact event occurs, the action processing block 150 executes an action processing for the contact event other than travel control. The action processing includes a recording process of tracking the pair P of the target objects B for which it has been determined that a contact event occurs, and recording the detection information.

In the recording process, the action processing block 150 records the information detected by the external camera relating to the pair P with respect to the contact event in a storage medium such as the memory 101. For example, the action processing block 150 records video data as the detection information during a specified recording period. The action processing block 150 may upload temporarily recorded video data to an external server or the like.

In the recording process, the action processing block 150 adjusts the control parameters of the external camera in the host vehicle A that is continuing to travel according to the tracking of the target objects B by the estimation block 110.

For example, the control parameters of the external camera are focal length, exposure value, F-number, and frame rate. The action processing block 150 in the first embodiment may adjust all the control parameters described above.

Figure 9:
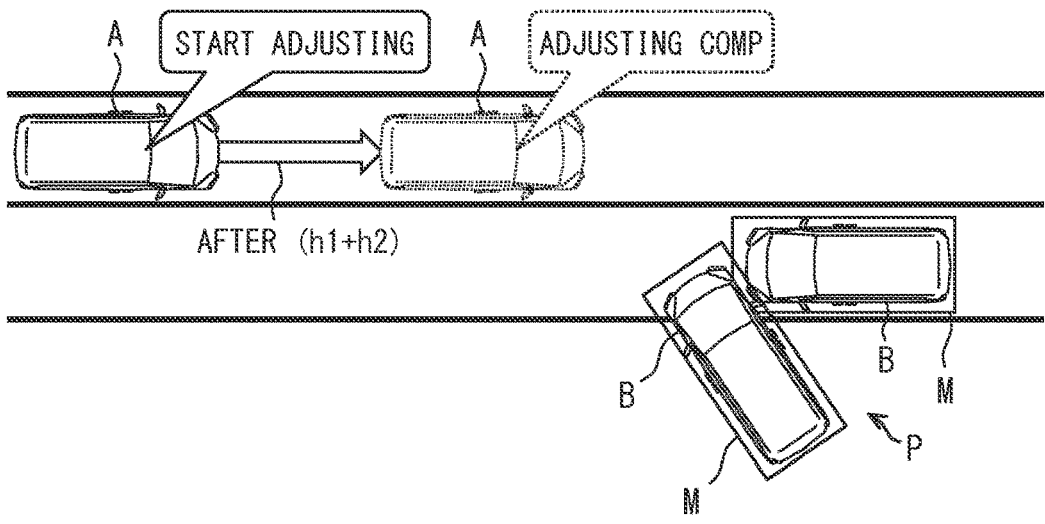
FIG. 9 is a schematic diagram for explaining control parameter adjustment of the external sensor according to the first embodiment.

The action processing block 150 calculates the focal length for imaging the pair P at the position (i.e., prediction position) of the host vehicle A after the prediction time instead of the current position of the host vehicle A (see FIG. 9). The prediction time is the sum of the measurement time h1 required to measure the distance between the pair P and the host vehicle A and the control time h2 required to control the external camera. The prediction time is an example of a "response delay time" from the start of adjustment to imaging. The prediction time may also include communication time for communication relating to the adjustment. The distance between the pair P and the host vehicle A may be the distance from the contact position between the target objects B to the host vehicle A. Alternatively, the distance between the pair P and the host vehicle A may be the distance from the center of gravity of any target object B in the pair P or the entire pair P to the host vehicle A. The action processing block 150 predicts the speed until after the prediction time, and calculates the focal length at the prediction position after the prediction time. In calculating the focal length, the action processing block 150 may use the speed profile v calculated and stored in advance. The action processing block 150 may calculate the focal length by inputting the speed profile v into a pre-stored function for converting the speed profile into the focal length.

The action processing block 150 also calculates the exposure value for capturing the pair P at the prediction position. The action processing block 150 further calculates an exposure value based on the light intensity information of the headlights of the host vehicle A and the reflectance of the target object B. The reflectance of the target object B may be estimated by detecting the reflected light emitted by the light source. The light source is, for example, flash light of an external camera, laser light of LiDAR, or the like. Alternatively, the reflectance of the target object B may be estimated based on material information of the target object B estimated by image recognition or the like.

Here, when light intensity information and position information regarding a light source other than the headlight can be acquired, the action processing block 150 may use the respective information to calculate the exposure value.

The action processing block 150 may calculate an exposure value by inputting the speed profile v into a pre-stored function that converts the speed profile v and the reflectance into an exposure value. Alternatively, the action processing block 150 may calculate the exposure value by inputting the speed profile v into a function for converting the speed profile v into the exposure value defined for each reflectance. Here, the prediction time may be the same time as in the case of the focal length. Alternatively, the prediction time may be different between the case of the focal length and the case of the exposure value. That is, in the case of the focal length, the control time h2 may be the time required to control the focal length, and in the case of the exposure value, the control time h2 may be the time required to control the exposure value.

Here, the action processing block 150 may calculate the focal length and the exposure value based on the acceleration profile instead of the speed profile.

The action processing block 150 adjusts the F-number based on the depth of field depending on the distance from host vehicle A to the pair P of the target objects B. More specifically, the action processing block 150 first calculates the depth of field to capture the target object B based on the size of the target object B in the direction of the optical axis of the external camera and the distance (i.e., the subject distance) from the host vehicle A to the target object B. The action processing block 150 may estimate the size in the optical axis direction based on the target model. The action processing block 150 calculates the F-number using the following three expressions based on the depth of field, the subject distance, the permissible circle of confusion, and the focal length. Here, the permissible circle of confusion is a predetermined value. Also, the focal length is a value calculated based on the prediction time described above.

$$\text{(Front depth of field)} = \frac{\text{(permissible circle of confusion)} \times (F \text{ number}) \times \text{(subject distance)}^2}{\{\text{(focal length)}^2 + \text{(permissible circle of confusion)} \times (F \text{ number}) \times \text{(subject distance)}\}} \qquad \text{[Expression 4]}$$

$$\text{(Rear depth of field)} = \frac{\text{(permissible circle of confusion)} \times (F \text{ number}) \times \text{(subject distance)}^2}{\{\text{(focal length)}^2 - \text{(permissible circle of confusion)} \times (F \text{ number}) \times \text{(subject distance)}\}} \qquad \text{[Expression 5]}$$

$$\text{(Depth of field)} = \text{(front depth of field)} + \text{(rear depth of field)} \qquad \text{[Expression 6]}$$

Here, the action processing block 150 stops adjusting the F-number when the F-number reaches a predetermined limit value.

Figure 10:
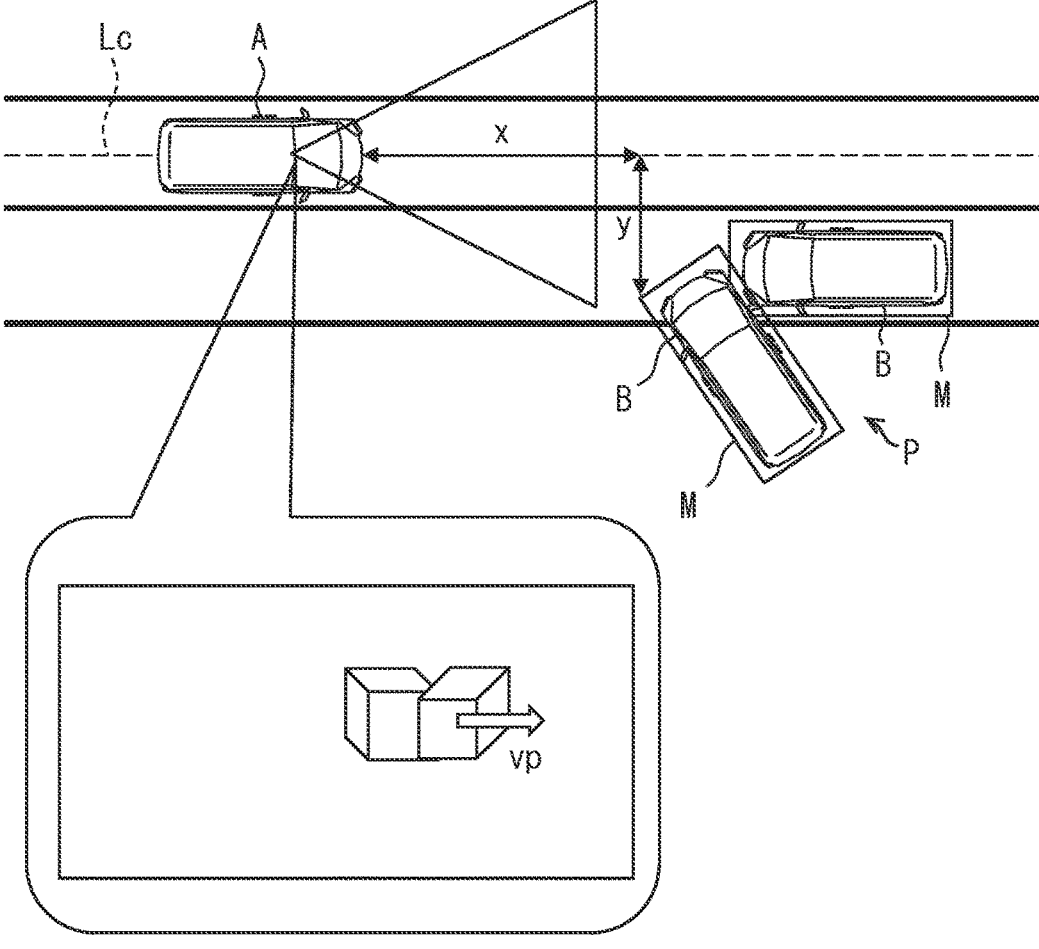
FIG. 10 is a schematic diagram for explaining control parameter adjustment of the external sensor according to the first embodiment.

The action processing block 150 adjusts the frame rate based on the displacement speed vp of the target object B on the captured image over time (see FIG. 10). Specifically, the action processing block 150 increases the frame rate as the displacement speed vp increases.

For example, in the case of an external camera whose imaging direction is the front, the displacement speed vp is given by the following expression 7. Here, x is the distance from the host vehicle A to the target object B in the imaging direction and v is the speed of the host vehicle A.

$$vp = k \times v / x^2 \qquad \text{[Expression 7]}$$

Here, k is a constant determined by the angle of view of the external camera and the distance y from the pair P to the travel trajectory of the host vehicle A. The action processing block 150 sets a frame rate according to (for example, proportional to) the displacement speed vp based on Expression 4. Here, the action processing block 150 stops adjusting the frame rate when the frame rate reaches a predetermined limit value. In FIG. 10, the distance y is the distance from the end of the pair P on the host vehicle A side. Alternatively, the distance y may be the distance from the contact position of the pair P or the distance from the center position of the pair P.

The action processing block 150 may include, in the response processing, notification processing for notifying the passenger of the host vehicle A of information related to the contact event by the information presentation system 50, and the like. The notification process may include notification of occurrence of a contact event. In addition, the notification process may include a change notification of the travel trajectory for the record travel control.

Through the cooperation of the blocks 110, 120, 130, 140, and 150 described so far, the event recording method flow (hereinafter referred to as the contact determination flow) for determining, by the event recording system 100, whether or not the contact event between the target objects B occurs in the vicinity of the host vehicle A will be described below with reference to FIGS. 11 to 13. This processing flow is repeatedly executed while the host vehicle A is activated. Each "S" in this processing flow means a plurality of steps executed by a plurality of instructions included in the event recording program.

Figure 11:
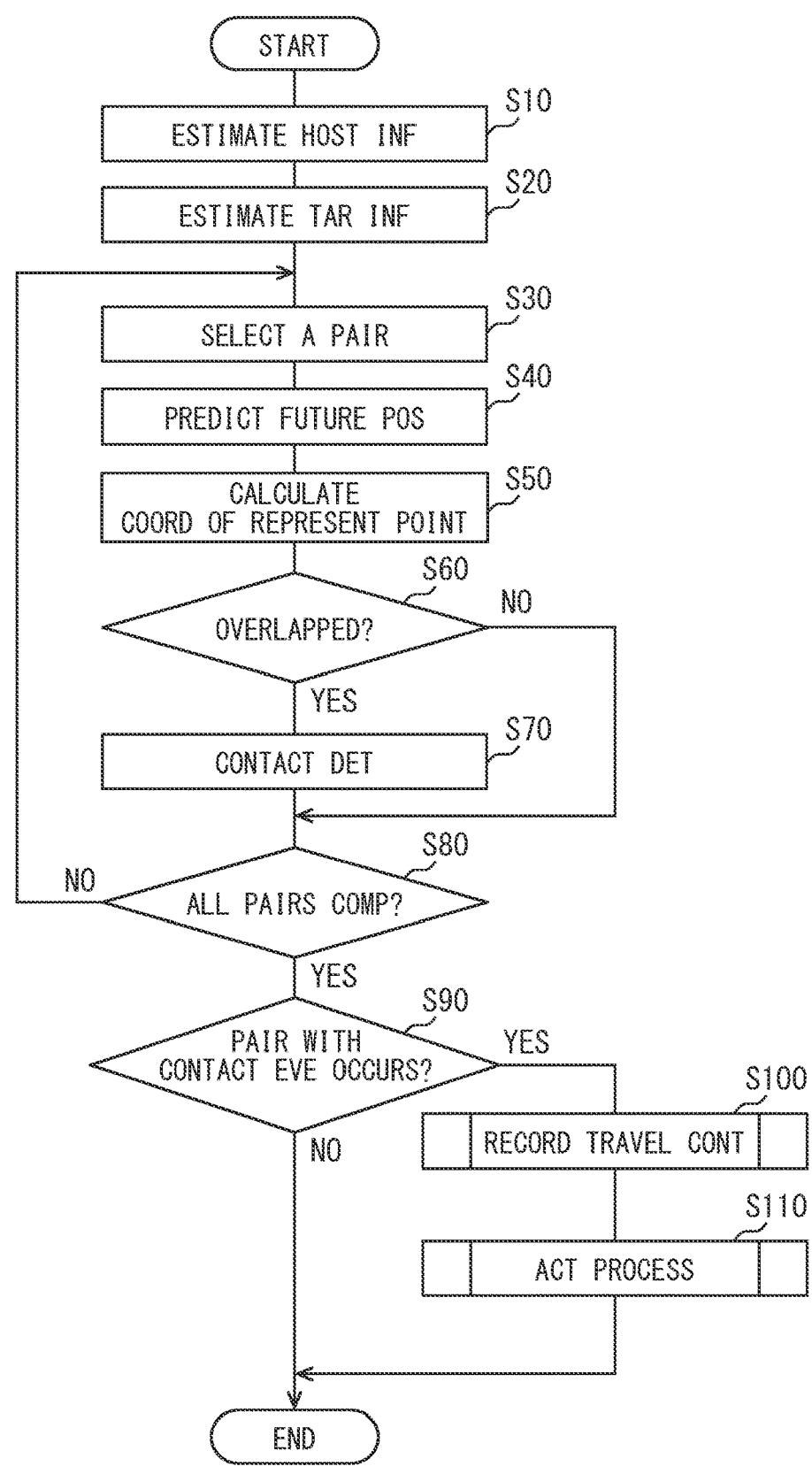
FIG. 11 is a flow chart showing an event recording method according to the first embodiment.
Figure 12:
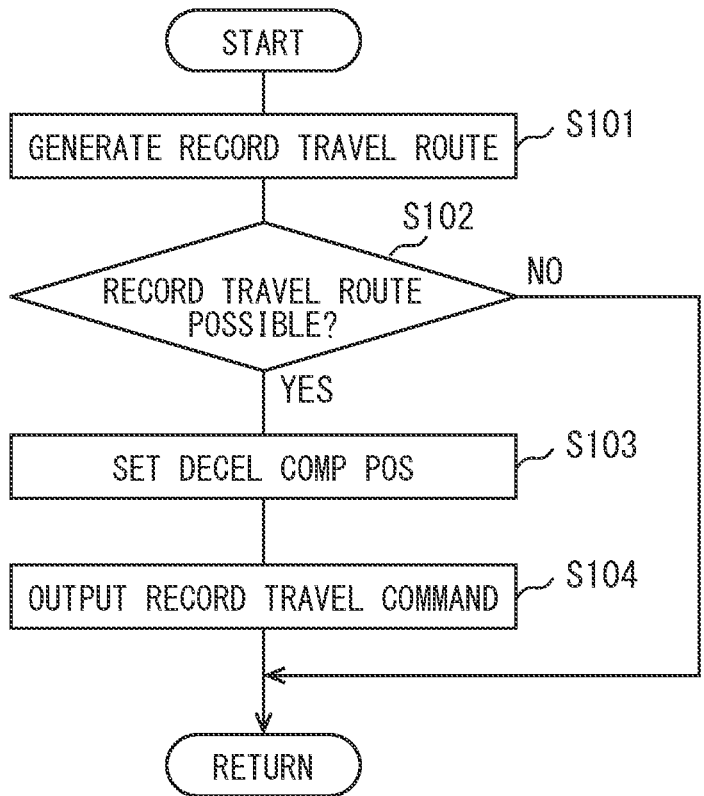
FIG. 12 is a flowchart showing detailed processing in FIG. 11.

First, in S10 of FIG. 11, the estimation block 110 estimates host information. At S20, the estimation block 110 estimates target information. Next, in S30, the overlap determination block 120 selects the pair P of the target objects B as the determination target. In subsequent S40, the overlap determination block 120 predicts the future position of each selected target object B. Furthermore, in S50, the overlap determination block 120 calculates the coordinates of the representative point in the target model M at the future position.

In subsequent S60, the overlap determination block 120 determines whether or not the target models overlap. When it is determined that there is overlap, in S70, the contact determination block 130 performs contact determination for the pair P based on the type information and the moving speed information. After the process of S70, the flow shifts to S80. On the other hand, if it is determined in S60 that there is no overlap, the process of S70 is skipped and the flow proceeds to S80.

In S80, the overlap determination block 120 determines whether or not the series of processes of S30 to S70 has been performed for all pairs P as the determination target. If it is determined that the processing has not been executed for all pairs P, the flow returns to S30. On the other hand, when it is determined that the process has been performed for all pairs P, the flow shifts to S90.

In S90, the contact determination block 130 determines whether or not there is a pair P of target objects B in which a contact event has occurred. If there is no pair P for which a contact event has occurred, this flow ends. On the other hand, if there is a pair P for which a contact event has occurred, the flow shifts to S100. In S100, the travel control block 140 executes the record travel control of the host vehicle A.

The detailed processing (i.e., sub-flow) of the record travel control executed by the travel control block 140 in S100 will be described with reference to the flowchart of FIG. 12. First, in S101, a record travel route RR is generated. Next, in S102, it is determined whether or not the record travel route RR is permissible. If it is determined that the record travel route RR is not permissible, this sub-flow ends while the normal route RN is maintained. On the other hand, if it is determined that the record travel route RR is permissible, the flow proceeds to S103. In S103, a deceleration completion position is set. In the following S104, a record travel command including the record travel route RR and the deceleration completion position is output. When the process of S104 is executed, this sub-flow ends, and the process proceeds to the process of S110.

Then, in S110, the action processing block 150 executes the action processing according to the contact determination result. Specifically, in S110, a contact event recording process is executed.

Detailed processing of the action processing control executed by the action processing block 150 in S110 will be described with reference to the flowchart of FIG. 13. First, in S111, the prediction time is calculated. In subsequent S112, the focal length is calculated based on the prediction time. Based on the calculated focal length, in S113, the actual focal length of the external camera is controlled. In subsequent S114, the size (i.e., target size) of the pair P in the optical axis direction is estimated. Then, in S115, the F value is calculated based on the size and the prediction time. In S116, it is determined whether or not the F value is the limit value. If it is determined that the F value has not reached the limit value, control of the F value is executed in S117. On the other hand, if it is determined in S116 that the F value has reached the limit value, the processing of S117 is skipped. In other words, control of the F value is interrupted.

In parallel with the processing of S112 to S117, the reflectance of the target object B is estimated in S118 following S111. In subsequent S119, an exposure value is calculated based on the reflectance and the prediction time. Based on the calculated exposure value, control of the exposure value is executed in S120.

In parallel with the processing of S111 to S120, the displacement speed of the target object B on the image is estimated in S121. In subsequent S121, the frame rate is calculated based on the displacement speed. In the following S123, it is determined whether or not the frame rate has reached the limit value. If it is determined that the frame rate has not reached the limit value, frame rate control based on the calculated frame rate is executed in S124. If it is determined in S123 that the frame rate has reached the limit value, the processing of S124 is skipped.

In S130, it is determined whether or not the target object B is outside the angle of view, or whether or not the distance to the target object B has reached the control end range. If it is determined that the target object B is within the angle of view, or the distance to the target object B has not reached the control end range, this sub-flow is repeated from the beginning. On the other hand, if it is determined that the target object B is out of the angle of view or the distance to the target object B has reached the control end range, this sub-flow ends.

According to the first embodiment described above, at least two of the target models M that are prepared by modeling the target objects B are used for determining that the overlap occurs, and it is determined whether or not a contact event occurs at the pair P of the target objects B determined that the overlap occurs, based on the type and the moving speed thereof. Therefore, it is possible to determine whether or not the contact event occurs, taking into consideration the behavior characteristics of each target object due to its type and moving speed. Then, the control parameter of the external sensor to be recorded can be adjusted according to the tracking of the pair of target objects at which the contact event has occurred. Therefore, the contact event can be reliably recorded. Furthermore, according to the first embodiment, it may be possible to determine whether or not a contact event occurs without using information about the target object B from the V2X communication.

Further, according to the first embodiment, the travelling behavior of the host vehicle A is controlled according to the record regarding the target object pair P in which the contact event has occurred. Therefore, it is possible to realize the travelling of the host vehicle A that is suitable for recording, so that it is possible to reliably record the contact event in view of this feature.

Second Embodiment

A second embodiment according to the present disclosure is a modification of the first embodiment. In the second embodiment, the contact determination block 130 may further classify the target object B classified as a two-wheel vehicle into a two-wheel vehicle with a drive source and a two-wheel vehicle without a drive source. The two-wheel vehicles having a drive source are, for example, motorcycles and motorized bicycles. The two-wheel vehicles without a drive source are, for example, bicycles.

In this case, the contact determination block 130 determines that a contact event occurs with respect to the pair P of the two-wheel vehicle with the drive source and the road installation object among the pair P of the two-wheel vehicle in the low speed range and the road installation object. On the other hand, the contact determination block 130 determines that no contact event occurs with respect to the pair P of the two-wheel vehicle without the drive source and the road installation object among the pair P of the two-wheel vehicle in the low speed range and the road installation object.

According to the second embodiment described above, for the pair P of the two-wheel vehicle in the low speed range and the road installation object, it is possible to more accurately determine whether or not a contact event with a predicted risk will occur depending on whether or not the two-wheel vehicle is equipped with a drive source.

Third Embodiment

The third embodiment of the present disclosure is a variation example of the first embodiment. The action processing block 150 of the third embodiment executes frame rate control based on at least one of the relative speed between the target object B and the host vehicle A and the yaw rate of the host vehicle A. For example, the action processing block 150 increases the frame rate as the relative speed increases. Also, the action processing block 150 increases the frame rate as the yaw rate increases.

An event recording method in the third embodiment will be described with reference to the flowchart of FIG. 14. In parallel with the processing of S111 to S120, the relative speed between the host vehicle A and the target object B and the yaw rate of the host vehicle A are estimated in S121*a*. A frame rate is calculated in S122 based on the value estimated in S121*a*.

Fourth Embodiment

The fourth embodiment of the present disclosure is a variation example of the first embodiment. The action processing block 150 of the fourth embodiment adjusts the imaging direction as a control parameter of the external camera. In this case, it is assumed that the external camera is attached with an actuator or the like capable of changing the imaging direction. For example, the action processing block 150 adjusts the imaging direction so as to direct the contact position of the pair P.

Figure 15:
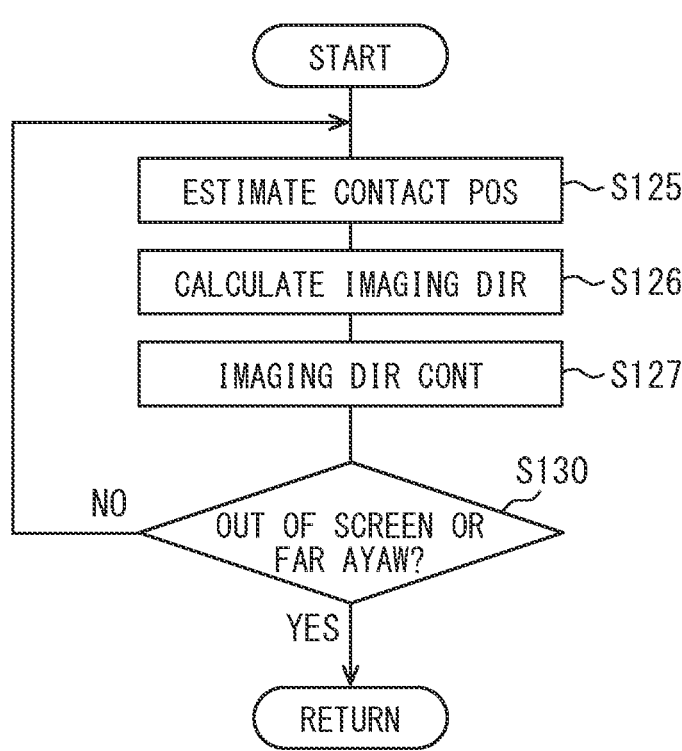
FIG. 15 is a flow chart showing an event recording method according to the fourth embodiment.

An event recording method in the fourth embodiment will be described with reference to the flowchart of FIG. 15. Here, the process in FIG. 15 is the detailed processing of S110 in FIG. 11. First, in S125, the contact position of the pair P is estimated. In subsequent S126, the imaging direction for directing the contact position is calculated. Then, in S127, the imaging direction is controlled according to the result of S126. After the process of S127, the flow shifts to S130.

Here, the action processing block 150 may execute the above-described processing in parallel with the control parameter processing in the first embodiment.

Other Embodiments

Although multiple embodiments have been described above, the present disclosure is not construed as being limited to those embodiments, and can be applied to various embodiments and combinations within a scope that does not depart from the spirit of the present disclosure.

In a modified example, the event recording system 100 may perform only one of the record travel control and the control parameter adjustment of the external sensor 11.

In a modification, the event recording system 100 may adjust the control parameters of external environment detection devices other than external cameras, such as LiDAR. For example, the event recording system 100 may control the LiDAR to increase the point cloud density of a specific range including the target object B. Also, in this case, the event recording system 100 may limit the irradiation range of the laser light to a specific range.

As a modification, the travel control block 140 may illuminate the target object B with the headlights in the record travel control.

As a modification, the action processing block 150 may limit the parameters for controlling among the focal length, the exposure value, the F-number, the frame rate, and the imaging direction.

The dedicated computer of the event recording system 100 of the modification example may include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

In addition to the embodiments described so far, the event recording system 100 according to the above-described embodiments and modifications may be implemented as an event recording device, which is a processing device (for example, a processing ECU, and the like) mounted on the host vehicle A. The above-described embodiment and the modification example may be realized as a semiconductor device (e.g. semiconductor chip) that has at least one processor 102 and at least one memory 101 of the event recording system 100.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An event recording system for recording a contact event occurring in a vicinity of a host vehicle equipped with an external sensor for detecting detection information of an external environment, comprising a processor, wherein:

the processor is configured to execute:

determining whether the contact event occurs at a plurality of target objects including at least one type of a road user and a road installation object other than the host vehicle, based on a type of the target objects, a moving speed of the target objects that are movable, and a presence or absence of overlap between target models that are prepared by modeling the target objects; and tracking a traveling behavior of a pair of target objects after the contact event, the pair of target objects comprising the target objects determined to have been contacted in the contact event, and recording the detection information relating to the pair of target objects; and the recording of the detection information includes adjusting a control parameter of the external sensor according to the detection information relating to the pair of target objects in the tracking of the pair while the host vehicle continues travelling, wherein:

a shape of a target model for a respective target object is determined based on the type of the target object, and the target model includes a rectangular model or a circular model.

2. The event recording system according to claim 1, wherein:

the adjusting of the control parameter includes controlling at least one of a focal length, an exposure value, a F-number, a frame rate and an imaging direction of an external camera.

3. The event recording system according to claim 2, wherein:

the adjusting of the control parameter includes predicting a response delay time from a start of the adjusting to imaging, and controlling at least one of the focal length and the exposure value based on the response delay time.

4. The event recording system according to claim 2, wherein:

the adjusting of the control parameter includes controlling the F-number based on a depth of field according to a distance from the host vehicle to the pair.

5. The event recording system according to claim 2, wherein:

the adjusting of the control parameter includes controlling the frame rate based on a displacement speed of the pair in a captured image.

6. The event recording system according to claim 2, wherein:

the adjusting of the control parameter includes controlling the frame rate based on a physical quantity of motion of the host vehicle.

7. The event recording system according to claim 1, wherein:

the processor is configured to further execute:

controlling a travelling behavior of the host vehicle in response to the recording of the detection information about the pair.

8. The event recording system according to claim 7, wherein:

the controlling of the travelling behavior includes mitigating a temporal change in a detection position of the detection information in the host vehicle that continues travelling, at least during a period in which the detection information regarding a specific range relating to the contact event of the pair is recorded.

9. The event recording system according to claim 7, wherein:

the controlling of the travelling behavior includes changing a travelling route of the host vehicle from the travelling route when the recording is not executed.

10. The event recording system according to claim 1, wherein:

the target object is modeled as a rectangular model when the target object is a vehicle, and the target object is modeled as a circular model when the target object is a person.

11. The event recording system according to claim 1, wherein:

the recording of the detection information includes recording video data of the travelling behavior of the pair of the target objects as the detection information during a specified recording period.

12. An event recording system for recording a contact event occurring in a vicinity of a host vehicle equipped with an external sensor for detecting detection information of an external environment, comprising a processor, wherein:

the processor is configured to execute:

determining whether the contact event occurs at a plurality of target objects including at least one type of a road user and a road installation object other than the host vehicle, based on a type of the target objects, a moving speed of the target objects that are movable, and a presence or absence of overlap between target models that are prepared by modeling the target objects; and tracking a traveling behavior of a pair of target objects after the contact event, the pair of target objects comprising the target objects determined to have been contacted in the contact event, and recording the detection information relating to the pair of target objects; and controlling a travelling behavior of the host vehicle according to the recording of the detection information relating to the pair of target objects, wherein:

a shape of a target model for a respective target object is determined based on the type of the target object, and the target model includes a rectangular model or a circular model.

13. The event recording system according to claim 12, wherein:

the target object is modeled as a rectangular model when the target object is a vehicle, and the target object is modeled as a circular model when the target object is a person.

14. An event recording device for recording a contact event occurring in a vicinity of a host vehicle equipped with an external sensor for detecting detection information of an external environment, comprising a processor, wherein:

the processor is configured to execute:

determining whether the contact event occurs at a plurality of target objects including at least one type of a road user and a road installation object other than the host vehicle, based on a type of the target objects, a moving speed of the target objects that are movable, and a presence or absence of overlap between target models that are prepared by modeling the target objects; and tracking a traveling behavior of a pair of target objects after the contact event, the pair of target objects comprising the target objects determined to have been contacted in the contact event, and recording the detection information relating to the pair of target objects; and the recording of the detection information includes adjusting a control parameter of the external sensor according to the detection information relating to the pair of target objects in the tracking of the pair while the host vehicle continues travelling, wherein:

a shape of a target model for a respective target object is determined based on the type of the target object, and the target model includes a rectangular model or a circular model.

15. The event recording device according to claim 14, wherein:

the target object is modeled as a rectangular model when the target object is a vehicle, and the target object is modeled as a circular model when the target object is a person.

16. An event recording device for recording a contact event occurring in a vicinity of a host vehicle equipped with an external sensor for detecting detection information of an external environment, comprising a processor, wherein:

the processor is configured to execute:

determining whether the contact event occurs at a plurality of target objects including at least one type of a road user and a road installation object other than the host vehicle, based on a type of the target objects, a moving speed of the target objects that are movable, and a presence or absence of overlap between target models that are prepared by modeling the target objects; and tracking a traveling behavior of a pair of target objects after the contact event, the pair of target objects comprising the target objects determined to have been contacted in the contact event, and recording the detection information relating to the pair of target objects; and controlling a travelling behavior of the host vehicle according to the recording of the detection information relating to the pair of target objects, wherein:

a shape of a target model for a respective target object is determined based on the type of the target object, and the target model includes a rectangular model or a circular model.

17. The event recording device according to claim 16, wherein:

the target object is modeled as a rectangular model when the target object is a vehicle, and the target object is modeled as a circular model when the target object is a person.

18. An event recording method executed by a processor for recording a contact event occurring in a vicinity of a host vehicle equipped with an external sensor for detecting detection information of an external environment, the event recording method comprising:

determining whether the contact event occurs at a plurality of target objects including at least one type of a road user and a road installation object other than the host vehicle, based on a type of the target objects, a moving speed of the target objects that are movable, and a presence or absence of overlap between target models that are prepared by modeling the target objects; and tracking a traveling behavior of a pair of target objects after the contact event, the pair of target objects comprising the target objects determined to have been contacted in the contact event, and recording the detection information relating to the pair of target objects; and the recording of the detection information includes adjusting a control parameter of the external sensor according to the detection information relating to the pair of target objects in the tracking of the pair while the host vehicle continues travelling, wherein:

a shape of a target model for a respective target object is determined based on the type of the target object, and the target model includes a rectangular model or a circular model.

19. The event recording method according to claim 18, wherein:

the target object is modeled as a rectangular model when the target object is a vehicle, and the target object is modeled as a circular model when the target object is a person.

20. An event recording method executed by a processor for recording a contact event occurring in a vicinity of a host vehicle equipped with an external sensor for detecting detection information of an external environment, the event recording method comprising:

determining whether the contact event occurs at a plurality of target objects including at least one type of a road user and a road installation object other than the host vehicle, based on a type of the target objects, a moving speed of the target objects that are movable, and a presence or absence of overlap between target models that are prepared by modeling the target objects; and tracking a traveling behavior of a pair of target objects after the contact event, the pair of target objects comprising the target objects determined to have been contacted in the contact event-occurs, and recording the detection information relating to the pair of target objects; and controlling a travelling behavior of the host vehicle according to the recording of the detection information relating to the pair of target objects, wherein:

a shape of a target model for a respective target object is determined based on the type of the target object, and the target model includes a rectangular model or a circular model.

21. The event recording method according to claim 20, wherein:

the target object is modeled as a rectangular model when the target object is a vehicle, and the target object is modeled as a circular model when the target object is a person.

\* \* \* \* \*